(12) United States Patent
Hamilton et al.

(10) Patent No.: US 6,732,934 B2
(45) Date of Patent: May 11, 2004

(54) ESCORTED SHOPPER SYSTEM

(75) Inventors: Alistair Hamilton, Stony Brook, NY (US); Shane Macgregor, Rocky Point, NY (US); Christopher Hosmer, Boston, MA (US)

(73) Assignee: Symbol Technologies, Inc., Holtsville, NY (US)

(*) Notice: Subject to any disclaimer, the term of this patent is extended or adjusted under 35 U.S.C. 154(b) by 317 days.

(21) Appl. No.: 09/759,493

(22) Filed: Jan. 12, 2001

(65) Prior Publication Data

US 2002/0092912 A1 Jul. 18, 2002

(51) Int. Cl.⁷ .................................................. G06K 7/10
(52) U.S. Cl. ....................... 235/472.01; 235/462.45; 235/462.44; 235/378; 235/385
(58) Field of Search ..................... 235/462.46, 378, 235/472.01, 472.02, 472.03, 462.44, 462.45, 462.47

(56) References Cited

U.S. PATENT DOCUMENTS

| | | | |
|---|---|---|---|
| 4,373,133 A | 2/1983 | Clyne et al. | 235/383 |
| 4,530,069 A | 7/1985 | Desrochers | 364/900 |
| 4,628,193 A | 12/1986 | Blum | 235/375 |
| 4,758,717 A | 7/1988 | Shepard et al. | 235/472 |
| 4,766,299 A * | 8/1988 | Tierney et al. | 235/462.21 |
| 4,850,009 A * | 7/1989 | Zook et al. | 379/93.17 |
| 5,047,614 A | 9/1991 | Bianco | 235/385 |
| 5,149,947 A | 9/1992 | Collins | 235/462 |
| 5,186,281 A | 2/1993 | Jenkins | 186/55 |
| 5,191,197 A * | 3/1993 | Metlitsky et al. | 235/462.44 |
| 5,208,446 A | 5/1993 | Martinez | 235/380 |
| 5,272,324 A * | 12/1993 | Blevins | 235/462.44 |
| 5,295,064 A | 3/1994 | Malec et al. | 364/401 |
| 5,310,997 A | 5/1994 | Roach et al. | 235/375 |
| 5,329,106 A * | 7/1994 | Hone et al. | 235/462.44 |
| 5,334,821 A | 8/1994 | Campo et al. | 235/380 |
| 5,345,071 A | 9/1994 | Dumont | 235/383 |
| 5,361,871 A | 11/1994 | Gupta et al. | 186/61 |
| 5,389,917 A | 2/1995 | LaManna et al. | 340/825.3 |

(List continued on next page.)

FOREIGN PATENT DOCUMENTS

| | | | |
|---|---|---|---|
| EP | 0619662 A2 | 3/1994 | |
| EP | 744856 A2 | 11/1996 | H04M/3/42 |
| EP | 697793 A3 | 12/1996 | H04N/7/15 |
| EP | 601064 B1 | 1/1997 | G07G/1/00 |
| JP | 11232534 A * | 8/1999 | |
| NL | 9002296 | 10/1990 | |
| WO | WO90/16033 | 12/1990 | G06F/15/20 |

OTHER PUBLICATIONS

The Wireless Store, The Strategic Environment for Retailing's Future (Symbol Technologies Brochure) Jan. 1992, p. 15.

Pankey, Deborah, "The Supermarkets of tomorrow Technology may make trips to the grocery store more pleasant" Chicago Daily Hearld, p. 4, MNIS, May 27, 1998 (MNIS).

Asthans, Abhaya; et al.; "Indoor Wireless System for Personalized Shopping Assistance," Mobile Computing Systems and Applications—Workshop Proceedings 1995, IEEE, pp. 69–74, 1995.

"Money Manager Interview—Michael J. Walker, Oak Tree Portfolio Management," Wall Street Transcript Digest, v13, n7, pN/A, May 16, 1994.

*Primary Examiner*—Karl D. Frech
*Assistant Examiner*—Daniel Walsh
(74) *Attorney, Agent, or Firm*—Mitchell S. Feller; Hogan and Hartson LLP

(57) ABSTRACT

A sales system having a plurality of wearable portable terminals each having an optical code reader and a wireless transceiver, a plurality of stationary terminals each having a wireless transceiver and a central database having information relating to goods to be sold by the system. A wireless network interconnects the portable terminals, stationary terminals and the central database.

22 Claims, 6 Drawing Sheets

U.S. PATENT DOCUMENTS

| | | | | |
|---|---|---|---|---|
| 5,393,965 A | * | 2/1995 | Bravman et al. | 235/383 |
| 5,397,882 A | | 3/1995 | VanSolt | 235/381 |
| 5,424,524 A | | 6/1995 | Ruppert et al. | 235/462 |
| 5,448,471 A | | 9/1995 | Deaton et al. | 364/401 |
| 5,468,942 A | | 11/1995 | Oosterveen et al. | 235/383 |
| 5,514,861 A | * | 5/1996 | Swartz et al. | 235/462.44 |
| 5,557,088 A | | 9/1996 | Shimizu et al. | 235/383 |
| 5,600,800 A | | 2/1997 | Kikinis et al. | 395/281 |
| 5,605,262 A | * | 2/1997 | Bond | 224/179 |
| 5,640,002 A | * | 6/1997 | Ruppert et al. | 235/462.46 |
| 5,646,389 A | | 7/1997 | Bravman et al. | 235/385 |
| 5,657,201 A | * | 8/1997 | Kochis | 361/686 |
| 5,664,110 A | | 9/1997 | Green et al. | 705/26 |
| 5,708,840 A | | 1/1998 | Kikinis et al. | 395/800 |
| 5,825,002 A | | 10/1998 | Roslak | 235/375 |
| 5,844,221 A | * | 12/1998 | Madigan et al. | 235/383 |
| 5,892,971 A | | 4/1999 | Danielson et al. | 395/827 |
| 5,914,481 A | | 6/1999 | Danielson et al. | 235/472 |
| 5,923,735 A | * | 7/1999 | Swartz et al. | 379/93.12 |
| 5,978,772 A | * | 11/1999 | Mold | 705/16 |
| 5,979,757 A | | 11/1999 | Tracy et al. | 235/383 |
| 5,979,766 A | * | 11/1999 | Rockstein et al. | 235/462.46 |
| 6,015,090 A | * | 1/2000 | Swartz et al. | 235/472.01 |
| 6,058,304 A | | 5/2000 | Callaghan et al. | 455/422 |
| 6,084,528 A | | 7/2000 | Beach et al. | 340/825.35 |
| 6,101,483 A | | 8/2000 | Petrovich et al. | 705/26 |
| 6,138,079 A | * | 10/2000 | Putnam | 702/50 |
| 6,223,987 B1 | * | 5/2001 | Knowles et al. | 235/462.44 |
| 6,382,357 B1 | * | 5/2002 | Morrison et al. | 186/61 |
| 6,386,450 B1 | * | 5/2002 | Ogasawara | 235/383 |
| 6,453,173 B1 | * | 9/2002 | Reber et al. | 455/557 |
| 6,523,752 B2 | * | 2/2003 | Nishitani et al. | 235/462.44 |
| 6,550,683 B1 | * | 4/2003 | Augustine | 235/462.45 |

* cited by examiner

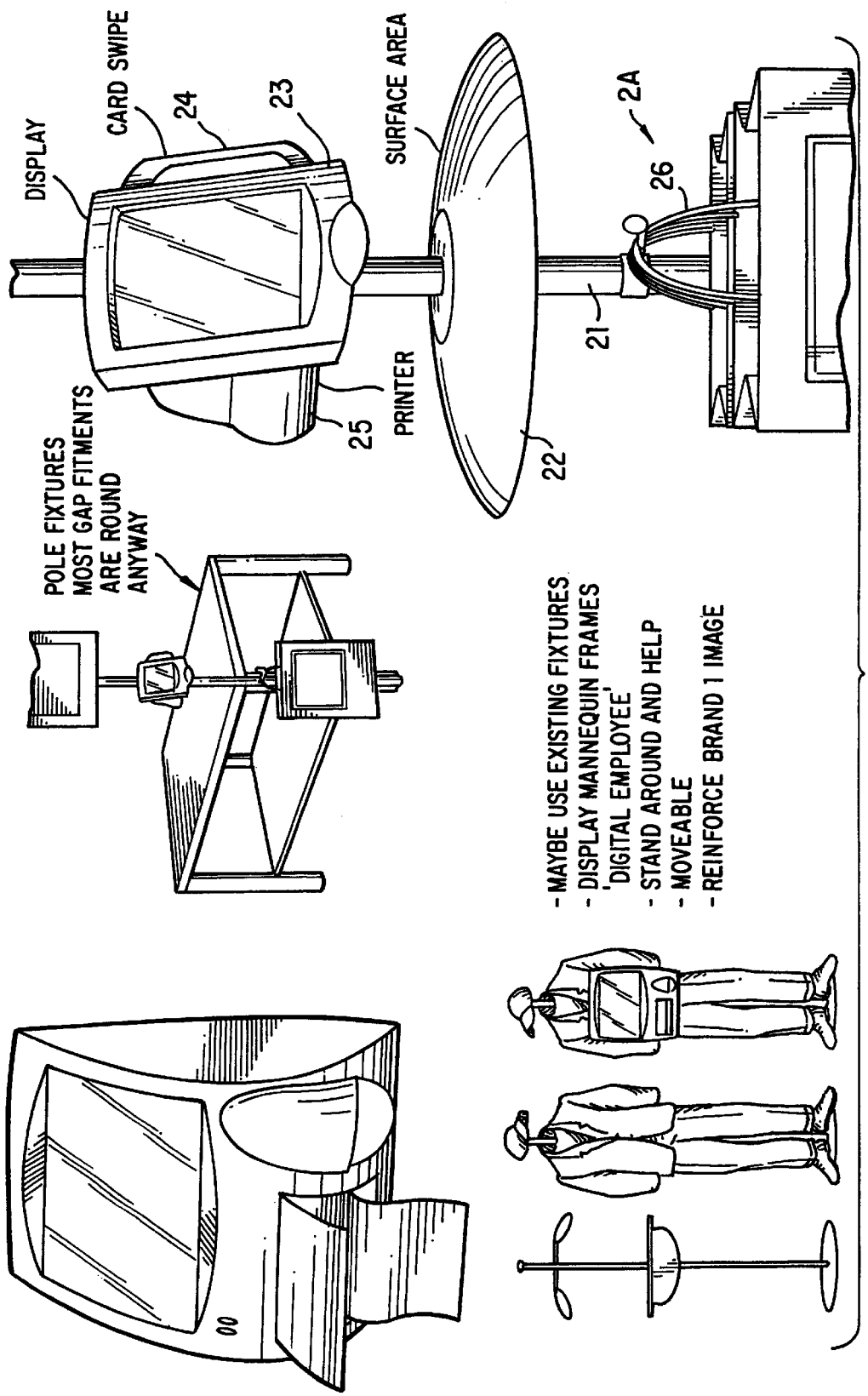

ESCORTED SHOPPER SYSTEM

BACKGROUND OF THE INVENTION

The present invention relates to a sales system, and in particular to an escorted shopper system.

Sales systems which incorporate portable terminals that are used by the shoppers to record purchases are known.

It has become apparent in retail stores that customers desire improved service, but it is difficult to provide with inexperienced employees and insufficient inventory information available to employees on the sales floor. Moreover, existing systems require the sales person to leave the customer to find out information that the customer seeks, and customers perceive this as poor service.

The main object of the present invention is to improve the known sales systems and to provide an escorted shopper system wherein the salesperson can accompany the customer on the sales floor even when information is being gathered for the customer.

Another object of the present invention is an improved wearable portable terminal which can be used in an escorted shopper system.

SUMMARY OF THE INVENTION

The escorted shopper system according to the present invention includes a plurality of wearable, portable terminals primarily for use by employees of a retail store and a plurality of stationary terminals. A central database has information relating to the goods to be sold in the store and a wireless network interconnects the portable terminals and the stationary terminals with the central database and each other. The present invention also relates to an improved wearable, portable terminal which can be used in the escorted shopper system according to the present invention.

The escorted shopper system empowers any employee in a retail setting to provide a more personal shopping experience by enabling the employee to escort the customer through every aspect of the shopping trip. Beginning as early as the point of entry in the store and continuing through the points of decision and ending at the point of sale, the employee is able to assist with anything, as well as complete the sale, without ever having to leave the customer. The system according to the present invention provides the platform that enables any store employee to completely follow through with any customer allowing a totally customized shopping experience.

The escorted shopper system in accordance with the invention provides all the necessary tools for dealing with a customer, including sales assistance, communication, transactional capabilities and access to inventory. The present invention consolidates all of these functions into one wearable, portable terminal that can be used by employees as part of the shopper system.

The escorted shopper system according to the present invention can operate in sales mode, inventory mode and transaction mode.

In the sales mode, the escorted shopper system serves as an on the spot resource for the employee, feeding the employee product, policy and/or customer service information as needed. Furthermore, the portable terminal acts as a communication link among employees, ensuring immediate sales or security assistance. In both cases, it eliminates the need for the employee to go to other areas of the store for assistance and leave the customer waiting. The portable terminal and the system provide an open platform for information dispersal and communication among employees, empowering the employees to more effectively and knowledgeably interface with customers. The customer is able to get a running total of chosen items before purchase, have any questions relating to those purchases answered, even by inexperienced employees, and enable the customer to find exactly what the customer is looking for.

In the inventory mode, the portable terminal and system allows an employee remote access to inventory databases, local or otherwise, as well as the ability to contribute to those databases in real time. The employee can actively update the database to insure accuracy. The system can act as a tracking system, not only of the in-store merchandise, but availability anywhere and creates the potential to close sales on merchandise outside the store's premises. Accurate tracking of inventory is extremely important for a retailer and up to the minute data integrity means never having to look in the stock for desired items, since this knowledge is at the employee's fingertips.

In the transactional mode, the terminal and system allows a customer to make a cashless transaction or multiple transactions anywhere in the store. This eliminates the need to wait in line and allows the processing of returns with credit given to an account. The portable units within the system act as a mobile point of sale, allowing an employee to conclude the transaction anywhere in the store.

In accordance with the invention, the escorted shopper system has two main components, the wearable, portable terminal which is worn by all employees and a series of stationary terminals which can be moved to different locations in a store, but are not portable. Both operate within the wireless network setup within the store. The wearable, portable terminal acts as a thin client utilizing wireless transceivers, preferably RF, while the stationary terminals act as an access point for information dissemination. Within the wireless network, employees are enabled to access and contribute to multiple databases remotely. The stationary terminals serve the employee and the customer by being both a mobile point of sale, as well as an informational kiosk and a self-service scanner.

The wearable, portable terminal, because it is connected to the network, has a display which serves as a window into the multiple databases accessible by the network. The employee is always connected to the store's computer and to other employees. The network in accordance with the present invention allows for voice over IP and therefore sales and security assistance can be obtained in real time and independent of physical proximity.

The wearable, portable terminals also preferably have a small laser scanner integrated therein to create the opportunity for cataloging merchandise real time anywhere in the store. A simple scan of the bar code on a tag can reconcile shrinkage and misplaced merchandise, as well as differentiate between sale and regularly priced items.

For transactional capabilities, the portable terminal preferably has a magnetic stripe reader embedded into the housing to allow credit cards to be swiped through the device. Carrying out a cashless transaction can now occur anywhere in the store. The signature and printing of a receipt will be carried out at the stationary terminals.

The stationary terminals can be located in multiple places throughout the store and, although normally stationary, are movable into different configurations within the store.

The stationary terminals can, in a compact configuration, contain only a display, a scanner, a printer, a magnetic stripe reader and peripheral fixtures, such as hanger and bag racks. After the customer's card has been swiped on the sales floor, the information can be relayed to the closest stationary terminal where the receipt is printed. Signature and bagging can take place at the stationary terminal as well. The terminals can also be used to present advertisements or as informational sources for customers, inviting the customers to use them for obtaining information about items within the store. The scanner associated with the stationary terminal, which is preferably an omni-directional scanner, would allow the customers to get a running total of chosen items at the terminal if they so choose. The stationary terminals are preferably not intended to replace point of sale terminals, but in addition thereto.

In one example of the use of the present invention, a sales associate for the retail store arrives at work and punches in an employee identification number into the network and is issued a portable, wearable terminal that is now connected to the storewide wireless network. The device automatically informs the employee of who is working with him and what positions they are assigned to. The employee can also use the system to find out for himself what floor positions are not already filled, so he can take one of those positions. The employee can also find out from the system that two employees are actively updating inventory and three employees are actively tied to the cash wrap and only two employees are actively working the sales floor. Therefore, the employee can toggle his device to the sales mode, since the inventory and transaction functions are already covered.

The employee, while waiting for customers, can start folding and updating inventory by scanning bar codes on the goods. In this way, the employee actively contributes to a real time inventory database that will determine week to week, day to day, and even hour to hour which merchandise should be pushed by the employees.

While this employee is busy in the back of the store, customers can be greeted at the entrance of the store by a second employee who is to provide a point of contact for customers. She can alert the first employee to the customer by paging using graphics, vibration or sound. Since the network allows for voice over IP, the wearable, portable terminal allows the units to act as open channel radios or two way telephones. Thus, the employee can respond to the page and attend to the customer.

When the customer tells him what she is looking for, he can check on his portable terminal if that item, and in the particular size, is in stock on the sales floor or in the back of the store. If the employee finds out that the item is in a location that he cannot access, he can page another employee who access to that location to obtain the item for the customer.

The employee can thereafter complete a purchase by checking out the customer using the portable terminal. The sales associate can swipe the customer's credit card on the magnetic stripe reader on the portable unit. The portable unit can alert the sales associate that the customer has an unused store credit from a previous return, and the sales associate can ask the customer if she would like to use the credit now. The receipt will be printed at the nearest stationary terminal location where the sales associate can bag the merchandise and allow the customer to sign the receipt.

As a result of the unique shape of the portable terminal in accordance with a preferred embodiment of the present invention, the device can be worn on the wrist like a watch, it can be clipped onto a belt or it can be tethered on a chain or the like around the neck. This way an employee has the benefit of hands free operation while still being able to access information. The device can also be held in a hand with the device wrapping around the middle finger without hindering its movement. This way the employee can use his or her hand even while holding the portable terminal. The housing of the terminal is preferably composed of a thermoplastic elastimer which is tactile enough to keep the product from slipping off one's finger. Moreover, in a preferred embodiment of the present invention the scan button is positioned directly where the corresponding knuckle on the index finger rests when the fingers are compressed, making it intuitive and comfortable motion for scanning.

In a preferred embodiment of the present invention, the portable terminal is smaller than a credit card, however, the clam shell-like fold over form factor enables the terminal to wrap around the card and read it by clicking the two halves together and sliding the magnetic stripe relative to the reader which is located near a flat surface on the inner surface of the terminal. With one hand holding the card stationary, the other is used to run the device along the bottom of the card where the reader is already aligned with the stripe.

The clam shell like fold over configuration lends itself to be worn like a pager, clipped onto a pocket or a belt. When snapped together, the band forms a closed loop making a perfect place to put a tether for wearing around the neck or through a key ring.

One of the advantages of the shopper system according to the present invention is the elimination of long lines at the cash wrap or point of sale.

These and other objects and advantages of the present invention are achieved in accordance with the present invention by a shopper system comprising a plurality of wearable, portable terminals each having one or more of various types of data acquisition devices such as an optical code reader such as a laser scanner or an imager, an RFID device and a magnetic stripe reader and a wireless transceiver, a plurality of stationary terminals each having a wireless transceiver, a central database having information relating to goods to be sold by the system and wireless network interconnecting the portable terminals, stationary terminals and the central database. In a particularly advantageous preferred embodiment of the present invention, each of the wearable terminals is a c-shaped or clam shell shaped housing configured to be worn on a wrist or clipped onto a pocket or belt.

These and other embodiments of the present invention will be disclosed in more detail hereinafter with reference to the attached drawings wherein:

BRIEF DESCRIPTION OF THE DRAWINGS

FIG. 2 is a schematic diagram of one embodiment of the stationary terminal of the system of FIG. 1;

DETAILED DESCRIPTION OF THE INVENTION

Figure 1:
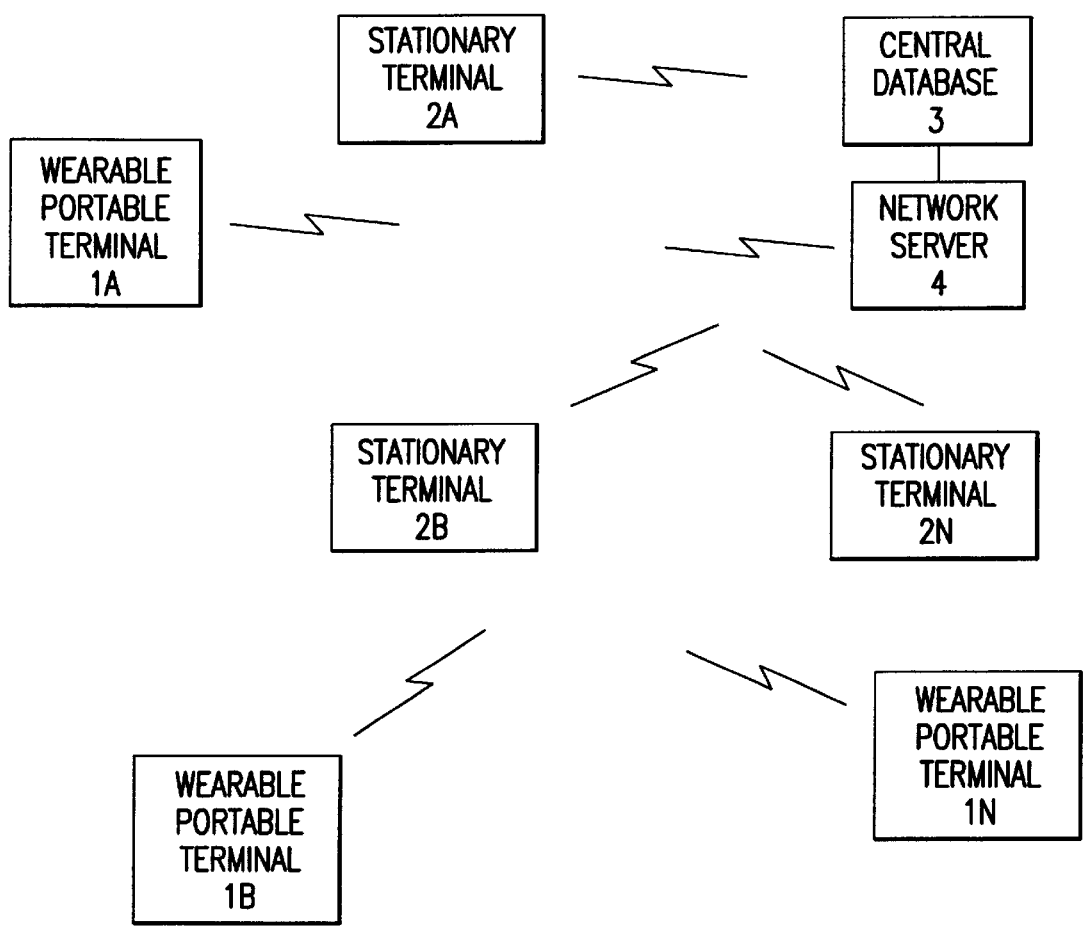
FIG. 1 is a block diagram of the system according to the present invention.

Referring to FIG. 1, the system according to the present invention comprises a plurality of wearable portable terminals 1A, 1B . . . 1N, each having a wireless transceiver for communicating with a plurality of stationary terminals 2A, 2B . . . 2N and a central database 3 through a network server 4. The stationary terminals and network server also include wireless transceivers capable of communicating with the portable terminals.

While the central database is shown as a single database in FIG. 1, it can be multiple databases which can be within a particular store, located in various stores or a central database located at a central location serving a plurality of stores. While a single database is shown, multiple databases can be accessed. Moreover, while the central database is shown to be separate from the network server 4, the two can be constituted by a single computer.

The stationary terminals may be moveable, that is, not permanently disposed in a location in a store, however, they are not moved during use as are the portable terminals.

FIG. 2 shows an example of the stationary terminal, 2A, which includes a pole 21, a working surface area 22, a display 23, a card swipe for magnetic stripe cards 24 and a receipt printer 25. The terminal can also include a bagging holder 26. The pole can be fixed in place and can be moved as necessary. The display 23 has the wireless transceiver built into it for receiving information from the portable terminals.

Figure 3A:
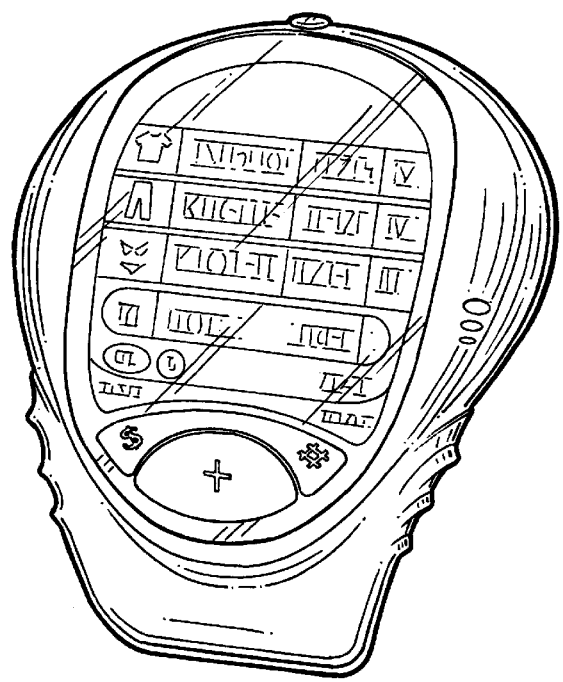
FIGS. 3A and 3B are two views of the wearable portable terminal according to the invention.
Figure 3B:
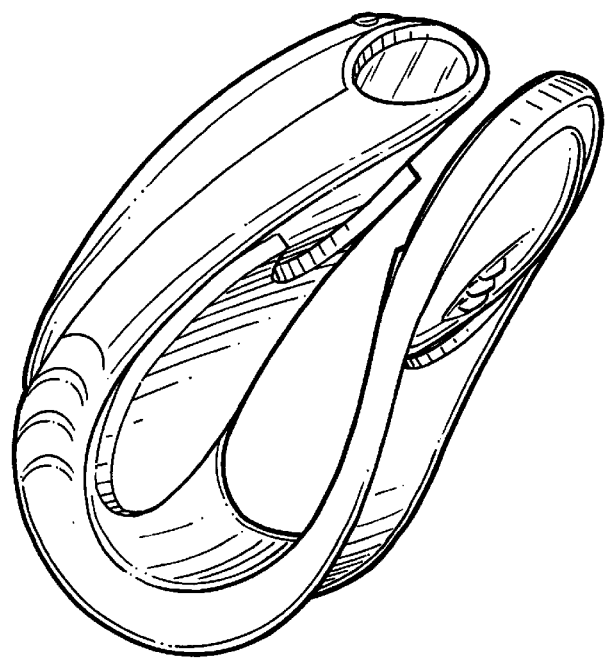

FIGS. 3A and 3B show two views of the portable, wearable terminal in accordance with one embodiment of the present invention.

Figure 4:
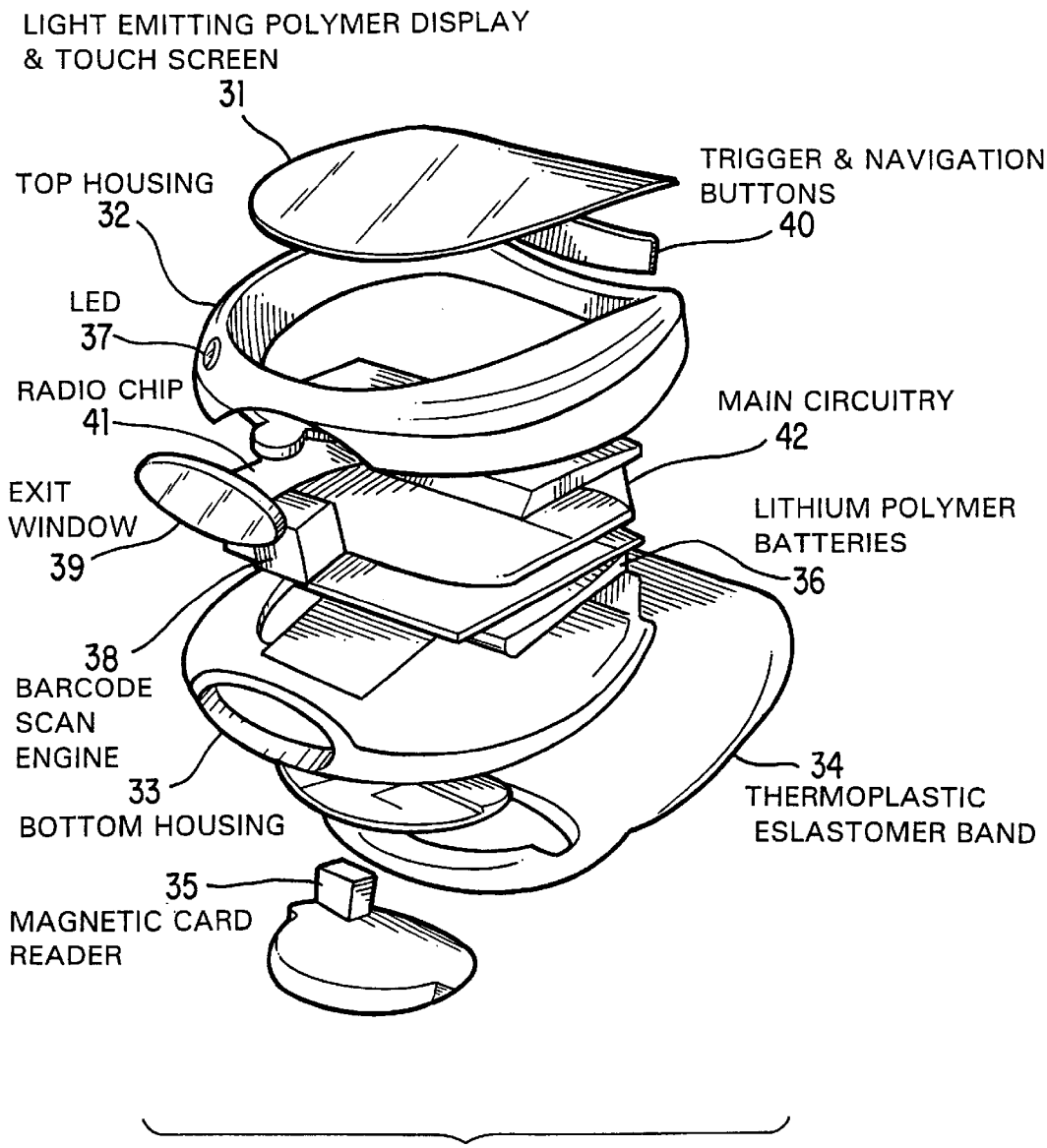
FIG. 4 is an exploded view of the terminal of FIGS. 3A and 3B.
Figure 5:
FIGS. 5–8 show various ways in which the portable terminal is worn and used.

The portable units 1A–1N include a C-shaped or clam shell shaped housing 10 having a display 11, a bar code scanner 12 and a magnetic stripe reader 13 therein. The construction of the device is shown in more detail in FIG. 4. As shown therein, the display comprises the light emitting polymer display and touch screen 31 and the housing includes a top housing 32, a bottom housing 33 and a thermoplastic elastic band 34. The magnetic card reader includes the magnetic card reader module 35 and also within the housing are lithium polymer batteries 36 and an LED 37. The scanner comprises a bar code scan engine 38, an exit window 39 and trigger and navigation buttons 40. A radio chip 41 provides the wireless transceiver capability. The circuitry for the device is disposed as a layer within the device and noted as 42.

Figure 6:
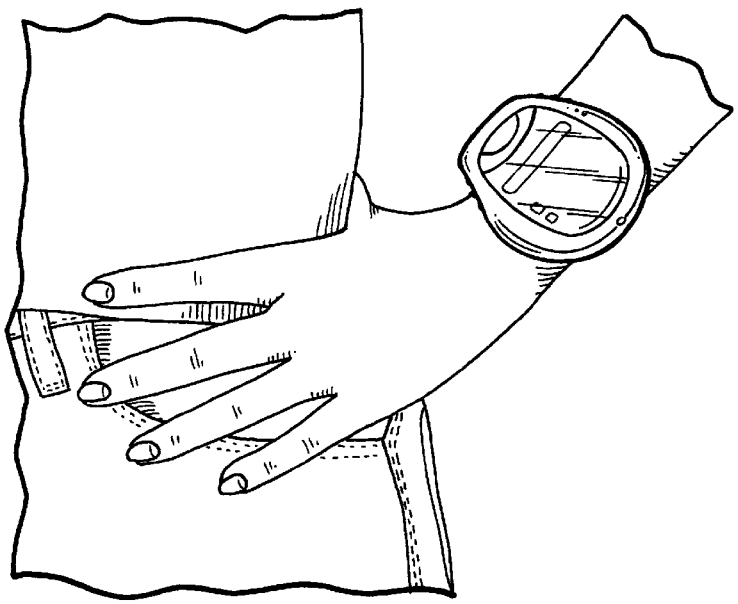
Figure 7:
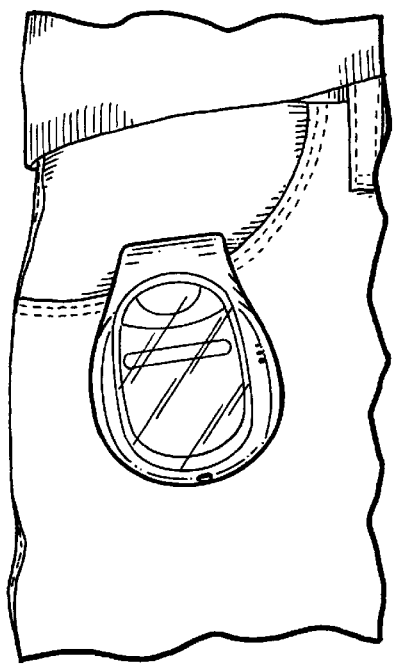

As shown in FIGS. 5–8, the configuration of the terminal makes it useful in various modes of operation. For example, in FIG. 5, the device is held around the index finger with the thumb resting on the trigger button 40 to enable the user to scan a bar code being held in the other hand as shown therein. In FIG. 6 is an example of the device being worn on the wrist so that the display is visible to the user by merely lifting the arm to one's face. In FIG. 7, the device is shown being worn on a pocket and it can be as easily worn on a belt if desired.

Figure 8:
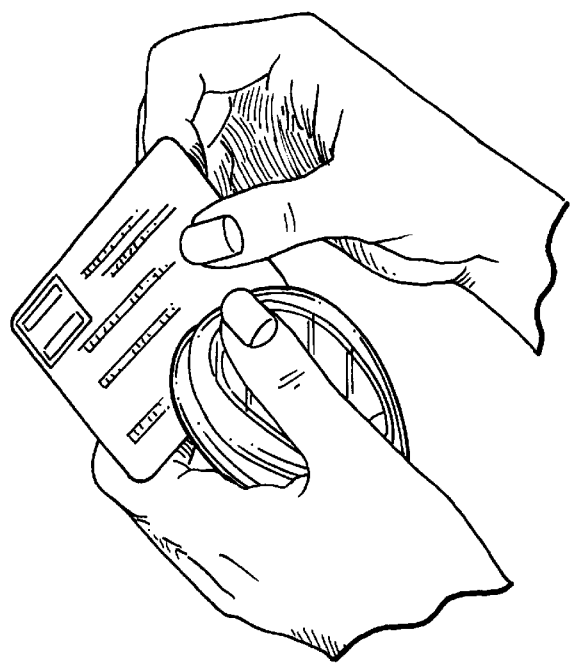

FIG. 8 shows the use of the device to read a magnetic stripe on a credit card. As shown therein, the two halves of the clam shell are pushed together so that the magnetic stripe of the card is held there between. A magnetic stripe sensing surface is provided on an inner surface of one of the end portions of the device housing. The device can then be swiped along the card to read the information thereon which can then be transmitted via the wireless transceiver to the nearest stationary terminal.

While the portable terminal has been described as being used in the escorted shopper system, it is understood that the terminal has many other uses. For example, the terminal can be used as a personal communicator or it can be used by customers in a retail system. Moreover, while the portable terminal has been shown to utilize an optical code reader such as a laser scanner, CCD imager, LED scanner or the like, the portable terminal can also have an RFID circuit for capturing information from RFID tags. The RFID circuit can be used instead of or in addition to the optical code reader. In fact, the portable terminal can use one or more different types of data acquisition devices for obtaining information to look up in one or more databases.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A sales system for use by a shopper escort comprising:

a plurality of wearable portable terminals each having an optical code reader and a wireless transceiver and configured to have a transaction mode of operation allowing customer transaction to be performed from the terminal and an inventory mode of operation allowing updating of an inventory database;

a plurality of stationary terminals each having a wireless transceiver;

a central database having information relating to goods to be sold by the system; and a wireless network interconnecting the portable terminals, stationary terminals and the central database.

2. The system according to claim 1, wherein the wearable portable terminals further comprise a display.

3. The system according to claim 1, wherein the wearable portable terminals further comprise a magnetic stripe reader.

4. The system according to claim 1, wherein the optical code reader of the wearable portable terminals comprises a laser bar code scanner.

5. The system according to claim 1, wherein the wearable portable terminals comprises a C-shaped housing.

6. The system according to claim 5, wherein the C-shaped housing is configured to be worn on the wrist.

7. The system according to claim 5, wherein the C-shaped housing has first and second opposing sides and is configured to be clipped on a pocket by inserting the first side into the pocket.

8. The system according to claim 5, wherein the C-shaped housing is configured to be hung from a necklace.

9. The system according to claim 1, wherein the stationary terminals further comprise a display.

10. The system according to claim 1, wherein the stationary terminals further comprise a printer.

11. The system according to claim 1, wherein the stationary terminals further comprise a magnetic stripe reader.

12. The system according to claim 1, wherein the stationary terminals further comprise an optical code reader.

13. The system according to claim 1, wherein the stationary terminals further comprise a hangar rack and a bag rack.

14. The system of claim 1, wherein the plurality of wearable portable terminals are each further configured to have a sales mode of operation providing at least one of policy and customer service information.

15. The system of claim 1, wherein the network provides voice over IP functionality and the plurality of wearable portable terminals are each further configured to provide voice communication between a first portable terminal and a second portable terminal.

16. The system of claim 1, wherein the plurality of wearable portable terminals each have a paging function, wherein the paging function allows an operator of a first portable terminal to page an operation of a second portable terminal.

17. A wearable portable terminal comprising:
  a C-shaped housing having a central portion and two opposing end portions connected thereto, the central portion of the housing comprising resiliently bendable material which is bendable to move the end portions of the C-shaped housing away from each other and which tends to bias the end portions towards each other;
  a wireless transceiver disposed in the housing; and
  an optical code reader disposed in the housing and having a window on the housing.

18. The terminal according to claim 17, wherein the C-shaped housing is resiliently bendable to move the two opposing end portions away from each other.

19. The terminal according to claim 17, wherein the end portions are biased towards each other to be adjacent without touching.

20. The terminal according to claim 17, wherein further comprising a display disposed on an outer surface of one of the end portions.

21. The terminal according to claim 17, wherein the window is disposed at one end of one of the end portions.

22. The terminal according to claim 17, further comprising a magnetic stripe reader in the housing and having a sensing surface on an inner surface of one of the end portions.

* * * * *